(12) United States Patent
Maeda et al.

(10) Patent No.: US 10,795,169 B2
(45) Date of Patent: *Oct. 6, 2020

(54) LASER HOMOGENIZING AND BEAM SHAPING ILLUMINATION OPTICAL SYSTEM AND METHOD

(71) Applicant: Palo Alto Research Center Incorporated, Palo Alto, CA (US)

(72) Inventors: Patrick Y. Maeda, Mountain View, CA (US); David K. Biegelsen, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,414

(22) Filed: Dec. 10, 2019

(65) Prior Publication Data

US 2020/0117016 A1 Apr. 16, 2020

Related U.S. Application Data

(63) Continuation of application No. 15/784,812, filed on Oct. 16, 2017, now Pat. No. 10,551,625.

(51) Int. Cl.
*G02B 27/09* (2006.01)
*G02B 6/02* (2006.01)
*G02B 6/24* (2006.01)
*F21V 8/00* (2006.01)
*G02B 26/08* (2006.01)

(52) U.S. Cl.
CPC ....... *G02B 27/0994* (2013.01); *G02B 6/0008* (2013.01); *G02B 6/02042* (2013.01); *G02B 27/09* (2013.01); *G02B 27/0927* (2013.01); *G02B 27/0961* (2013.01); *G02B 6/0006* (2013.01); *G02B 6/241* (2013.01); *G02B 26/0833* (2013.01)

(58) Field of Classification Search
None
See application file for complete search history.

(56) References Cited

U.S. PATENT DOCUMENTS

| 5,923,475 A | 7/1999 | Kurtz et al. |
| 6,064,528 A | 5/2000 | Simpson, Jr. |
| 6,137,631 A * | 10/2000 | Moulin .............. G06K 15/1238 359/618 |

(Continued)

*Primary Examiner* — Michelle R Connelly
(74) *Attorney, Agent, or Firm* — Caesar Rivise, PC (57) ABSTRACT

An illuminator optical system combines, homogenizes, and shapes light spatially and angularly from one or more high power fiber coupled lasers. It may include a multichannel fiber cable, collimation and beam shaping optics, a multiple lens array (e.g., fly's eye lens array), and an objective lens. The multichannel fiber collects the light from the high power fiber coupled lasers and produces an aligned array of one or more optical fibers at the output of the cable. The light output from the cable is collimated and relayed to a multiple lens array that spatially divides and shapes the light into an array of beams. The objective lens homogenizes the light by collimating and overlapping the beams into a uniform top hat irradiance distribution in at least one dimension, resulting in the illumination pattern having the required spatial size and desired angular distribution at the illumination plane.

20 Claims, 4 Drawing Sheets (56) References Cited

U.S. PATENT DOCUMENTS

| | | |
|---|---|---|
| 6,611,382 B2 | 8/2003 | Hashimoto |
| 10,551,625 B2 * | 2/2020 | Maeda ............... G02B 6/02042 |
| 2007/0206383 A1 * | 9/2007 | Broude ................ G02B 27/09 |
| | | 362/268 |
| 2015/0248010 A1 | 9/2015 | Schowengerdt |
| 2016/0026253 A1 | 1/2016 | Bradski et al. |
| 2016/0109652 A1 | 4/2016 | Schowengerdt |

* cited by examiner

LASER HOMOGENIZING AND BEAM SHAPING ILLUMINATION OPTICAL SYSTEM AND METHOD

CROSS-REFERENCE TO RELATED APPLICATIONS

This application is a continuation of U.S. patent application Ser. No. 15/784,812, filed Oct. 16, 2017, entitled "Laser Homogenizing and Beam Shaping Illumination Optical System and Method".

FIELD OF DISCLOSURE

This invention relates generally to high power laser illumination or projection systems, and more particularly, to high power laser illumination or projection systems in high speed and high resolution two-dimensional (2D) and (3D) printing and engraving.

BACKGROUND

High power laser imaging is increasingly employed in modern printing operations. One example of a laser imaging technique utilized in these operations is offset lithography. In a typical lithographic process, a printing plate (e.g., a flat plate, an outer surface of a cylinder, belt) can be configured with "image regions" formed of, for example, hydrophobic and oleophilic material, and "non-image regions" formed of a hydrophilic material. Such image regions correspond to areas on a print media that are occupied by a printing or a marking material such as ink, whereas the non-image regions correspond to the areas on the print media not occupied by the marking material.

Variable data lithography (also referred to as digital lithography or digital offset) utilized in printing processes typically begins with a fountain solution that dampens an imaging plate (e.g., metal, silicone) on an imaging member (e.g., drum, cylinder, belt). The fountain solution forms a film on the imaging plate that may be about one (1) micron thick or less. The imaging member rotates to an "exposure" station where a high power laser imaging module (LIM) removes the fountain solution at the locations of the imaging plate where the image pixels are to be formed. This forms a fountain solution based 'latent image'. The drum then further rotates to a 'development' station where lithographic-like ink may be brought into contact with the fountain solution based 'latent image' and ink 'develops' onto the places where the laser has removed the fountain solution. The drum then rotates to a transfer station where the ink is transferred to an offset blanket cylinder and then to print media such as paper.

A LIM that forms the latent image may include one or more lasers that work with one or more optical components to direct the laser onto the printing plate. Known approaches use a bar laser having a series of linearly arranged emitters which emit laser beams substantially in parallel that are superimposed on a grating light valve spatial light modulator (SLM) having a plurality of micro-lenses arranged in the corresponding relationship to the emitters of the bar laser. See, for example, U.S. Pat. No. 6,611,382. The laser provides constant illumination to the mirror array. The mirror array may deflect individual micro-mirrors to form the pixels on an image plane to pixel-wise evaporate the fountain solution on the silicone plate. If a pixel is not to be turned on, the mirrors for that pixel deflect such that the laser illumination for that pixel does not hit the imaging plate.

High power illuminators are needed for applications like 2D and 3D printing and engraving where light from the illuminators are incident on a rectangular pixelated SLM, like a Digital Light Processing (DLP) chip or Digital Micro-mirror Device (DMD). Achieving high laser power (e.g., 50 W up to 400 W) required to sufficiently light rectangular pixelated SLMs is difficult and expensive for a single laser device.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing an illumination optical system that may combine, homogenize, and shape the light spatially and angularly from one or more high power fiber coupled lasers. The illumination optical system may include a multichannel fiber cable, collimation and beam shaping optics, a multiple lens array, and an objective lens. The multichannel fiber cable is designed to collect light from high power fiber coupled lasers and produce an aligned array of one or more optical fibers at the output of the cable. The light output from the cable may be collimated and relayed to a multiple lens array (e.g., a fly's eye lens array) intentionally designed to spatially homogenize and shape the light into an array of beams or beamlets in at least one dimension. The design of the collimation and beam shaping optics, multiple lens array, and objective lens combine to produce the required spatial size of the illumination pattern, having a uniform top hat irradiance distribution in at least one dimension, and its desired angular distribution at the illumination plane.

According to aspects illustrated herein, an illumination optical system for high power illumination with uniform irradiance distribution onto a spatial light modulator may include a multichannel fiber cable, a collimator lens, a multiple lens array, beam shaping optics, and an objective lens. The multichannel fiber cable includes an input end and an output end, with the input end having a plurality of individual optical fibers that are optically coupled into a single output aligned array of the individual optical fibers at the output end. The multichannel fiber cable may collect light from multiple individual high power lasers having the same wavelength and polarization characteristics and to project a single high power optically combined light from the output end of the multichannel fiber cable. The collimator lens may collimate the light from the output end of the multichannel fiber cable. The multiple lens array may include multiple individual optical elements having curved surfaces that spatially divide the collimated light from the collimator lens and converts the light into an array of beams or beamlets in at least one dimension. The multiple lens array is located at or in the vicinity of the front focal plane of the objective lens. The objective lens collimates the beamlets and overlaps them on the illumination plane to produce a uniform top hat irradiance distribution at the spatial light modulator, with the output end of the multichannel fiber cable, the collimator lens, the multiple lens array and the objective lens aligned along an axis corresponding to the direction of the optically combined light from the output end of the multichannel fiber cable. Additional beam shaping optics may be used if needed to achieve the desired size and angular distribution of the illumination pattern at the illumination plane.

According to aspects illustrated herein, a method of high power illumination with uniform irradiance distribution onto a spatial light modulator includes collecting light from multiple individual high power lasers having the same wavelength and polarization characteristics into a multichannel fiber cable including an input end and an output end, the input end having a plurality of individual optical fibers that are optically coupled into a single output aligned array of the individual optical fibers at the output end, projecting a high power optically combined light from the output end of the multichannel fiber cable, collimating the light from the output end of the multichannel fiber cable into collimated light with a collimator lens, spatially homogenizing the collimated light from the collimator lens and shaping the light into a spatially transformed light having a uniform top hat irradiance distribution in a dimension with a multiple lens array including multiple individual optical elements having curved surfaces, the multiple lens array dividing the collimated light into sections, homogenizing the light by overlapping the sections of light, and shaping the sections of light onto an illumination plane at the spatial light modulator with an objective lens, wherein the output end of the multichannel fiber cable, the collimator lens, the multiple lens array and the objective lens are aligned along an axis corresponding to the direction of the optically combined light from the output end of the multichannel fiber cable.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

The disclosed illumination optical system may be operated by and controlled by appropriate operation of conventional control systems. It is well known and preferable to program and execute imaging, printing, and other control functions and logic with software instructions for conventional or general purpose microprocessors, as taught by numerous prior patents and commercial products. Such programming or software may, of course, vary depending on the particular functions, software type, and microprocessor or other computer system utilized, but will be available to, or readily programmable without undue experimentation from, functional descriptions, such as, those provided herein, and/or prior knowledge of functions which are conventional, together with general knowledge in the software of computer arts. Alternatively, any disclosed control system or method may be implemented partially or fully in hardware, using standard logic circuits or single chip VLSI designs.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. It will be appreciated by respective engineers and others that many of the particular components mountings, component actuations, or component drive systems illustrated herein are merely exemplary, and that the same novel motions and functions can be provided by many other known or readily available alternatives. What is well known to those skilled in the art need not be described herein.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

When referring to any numerical range of values herein, such ranges, are understood to include each and every number and/or fraction between the stated range minimum and maximum. The same applies to each other numerical property and/or elemental range set forth herein, unless the context clearly dictates otherwise.

The term "printing device", "imaging machine" or "printing system" as used herein refers to a digital copier or printer, scanner, image printing machine, xerographic device, electrostatographic device, digital production press, document processing system, image reproduction machine, thermal printing system, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

High power illuminators are needed for applications like 2D and 3D printing and engraving where the light is incident on a rectangular pixelated spatial light modulator (SLM), like a Digital Light Processing (DLP) chip or Digital Micromirror Device (DMD), which is then projected and imaged onto a target object or medium. The irradiance distribution from light sources (e.g., circular laser fibers) onto a SLM having a rectangular shaped array must be shaped to match the rectangular array shape in at least one dimension. The light must also be homogenized since the light sources can be spatially and angularly non-uniform and the light incident on the SLM typically must have a uniform top-hat irradiance profile in at least one dimension. An additional requirement, imposed by a post SLM projection or image is restriction on the angular distribution of the light incident on the SLM. Achieving high laser powers (e.g., 80 W to 100 W) are difficult and expensive for a single laser device.

Figure 1:
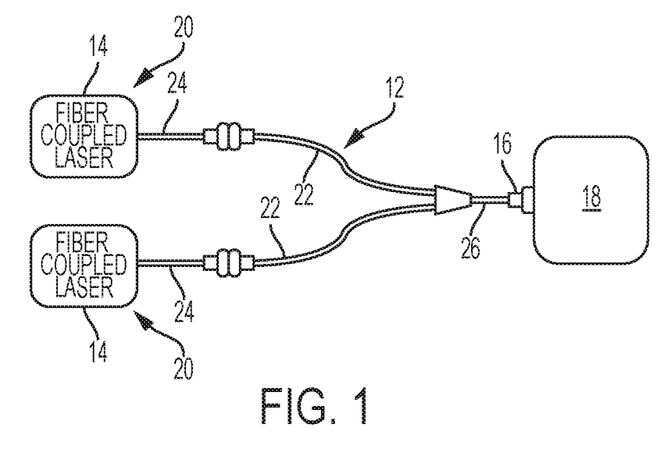
FIG. 1 is a side view of an exemplary laser homogenizing and beam shaping illumination optical system of the invention.

FIG. 1 depicts an exemplary laser homogenizing and beam shaping illumination optical system 10 including a multichannel fiber cable 12 that may combine individual lasers 14 to produce one high power source emmiting a light at output 16 to illumination optics 18. In this example, light from multiple laser diodes 20 are optically coupled via output fibers 24 to multiple optical fiber cables 22 and converged into a single output multimode optical fiber cable 26. The multiple laser diodes 20 may have the same wavelength and polarization characteristics (e.g., the orientation of the vibration pattern or oscillation of light waves in a singular plane).

Figure 2:
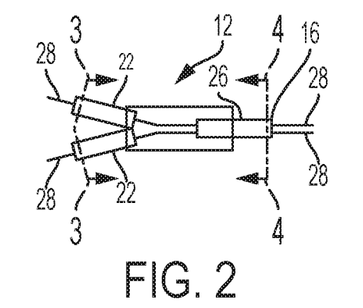
FIG. 2 is a top plan view of an exemplary multichannel fiber cable.
Figure 3:
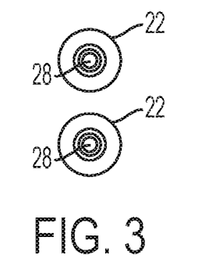
FIG. 3 is a sectional view of an input end of the exemplary multichannel fiber cable taken along line 3-3 of FIG. 2.
Figure 4:
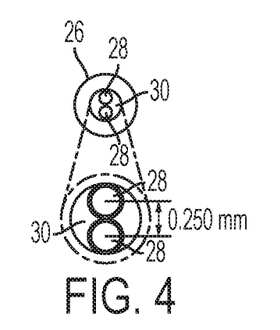
FIG. 4 is a sectional view of the converged output end of the exemplary multichannel fiber cable taken along line 4-4 of FIG. 2.

FIGS. 2-4 depict an exemplary multichannel fiber cable 12. As can be seen in FIG. 2, the cable 12 may be a bifurcated cable having core fiber 28, cladding 30, protective coating 32 and outer jacket 34. Two individual core fibers 28 at an input end 36 of the cable 12 are optically coupled into a single output aligned array of closely spaced core fibers 28 within a single cladding 30 at the converged output 16. With this configuration, the multichannel fiber cable 12 is specifically designed to collect light from multiple individual high power lasers 14 and project a single high power optically combined light from the output end 16 of the multichannel fiber cable. The shape of the output 16 of the converged output fiber cable 26 may be circular. It should be noted that the embodiments are not limited to a bifurcated cable as the multichannel fiber cable 12, as other numbered fiber cables are contemplated, including trifucated, quadfurcated and other multi-furcated cable designs.

FIG. 3 is a sectional view of an input end of the multichannel fiber cable 12 taken along line 3-3 of the individual fibers 28. Each fiber 22 may include, for example, a 0.22 NA Low OH step-index core fiber 28 having a 0.2 mm core diameter and a 0.22 mm cladding 30 diameter. FIG. 4 is a sectional view of the converged output fiber cable 26 of the multichannel fiber cable 12 taken along line 4-4 of the converged end. For fiber cables 22 having a 0.2 mm core fiber 28 diameter and a 0.22 mm cladding 30 diameter, their converged fibers at the converged output fiber cable 26 may have centers separated by about 0.25 mm. Of course trifurcated (and higher) numbered cables can also be used. Fibers of different core and cladding diameters and different NA can also be used. Of course it is understood that the materials of the fibers and the connectors are designed to handle the high optical powers.

Figure 5:
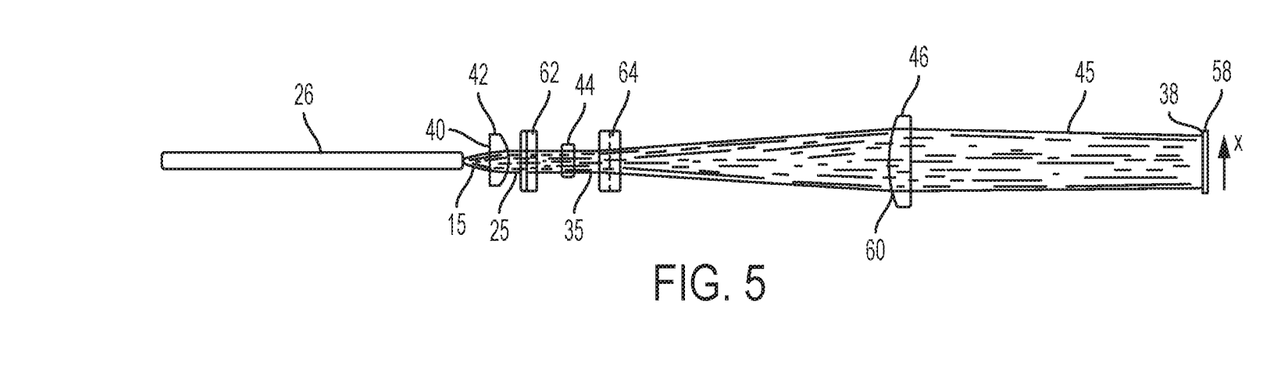
FIG. 5 is a top plan view of an exemplary illumination apparatus including illumination optics seen in the direction of the fast or y-axis thereof.
Figure 6:
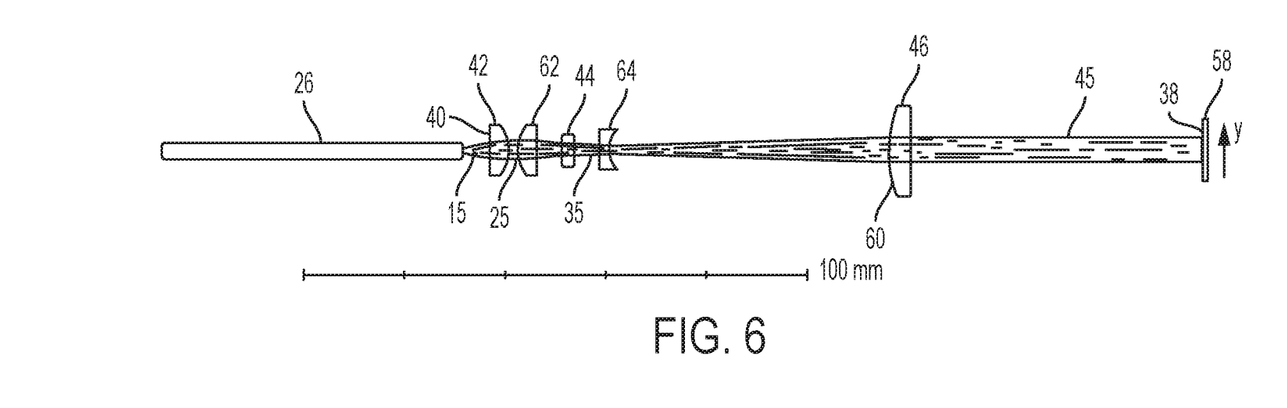
FIG. 6 is a side elevation view of the exemplary illumination apparatus of FIG. 5 seen in the direction of the slow or x-axis thereof.

FIG. 5 depicts a top view of an illumination apparatus including the illumination optics 18 seen in the direction of the fast or y-axis thereof with ray traces emitted from the converged output fiber cable 26 of the multichannel fiber cable 12. FIG. 6 depicts a side view of the illumination apparatus shown in FIG. 5 seen in the direction of the slow or x-axis. As can be seen in FIGS. 5 and 6, the illumination optics 18 may include a collimator lens 40, a multiple lens array 44 and an objective lens 46 aligned along an axis corresponding to the mean direction of the optically combined light 15 from the output 16 of the converged output fiber cable 26. The collimator lens 40 is designed to narrow the divergence of the beams of light 15 emitted from the multichannel fiber cable 12 into collimated light 25. The collimator lens 40 may have a curved surface 42 that causes the directions of light to become more aligned to a specific direction (e.g., less divergent to an axis corresponding to the mean direction of the light 15). The curved surface 42 may be aspheric or spherical.

Figure 7:
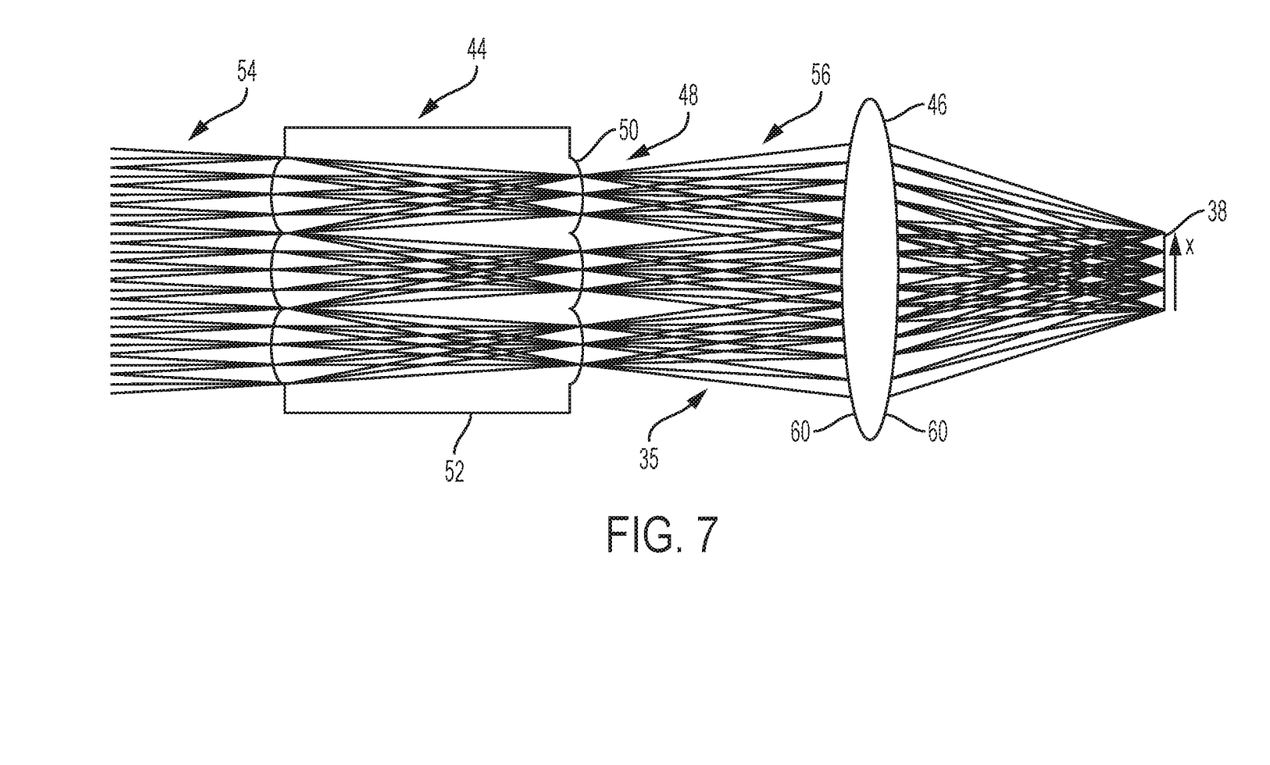
FIG. 7 is a sectional view of a multiple lens array and objective lens according to examples of the invention.

FIG. 7 is an exemplary illustration showing how the multiple lens array 44 affects light input. The multiple lens array 44 may include multiple individual optical lenslets 48 or sections having curved surfaces 50 designed to divide the collimated light 25 in each section into an array of beams or beamlets 35. The multiple lens array 44 may be a fly's eye array 52 having, for example, a two array imaging architecture implemented with a double-sided lenslet array. The multiple individual optical elements 48 may spatially transform light from a nonuniform distribution 54 to a spatially transformed light 35 having an array of beams or beamlets in at least one dimension, for example along the x-axis or y-axis where the z-axis is coincident with the optical axis or centerline of the optical system.

Still referring to FIGS. 5-7, the objective lens 46 collimates the transformed light 35 from the multiple lens array 44 and spatially homogenize the light by overlapping the beamlets into spatially transformed light 45 onto the illumination plane 38 located, for example, along a plurality of micro-mirrors of a spatial light modulator 58. While the objective lens 46 is shown as a spherical lens, it is understood that the objective lens may be a single lens or combinations of several optical lenses, including one or more cylinder or spherical lenses. In addition, the objective lens may have curved surfaces 60 on one or both sides of the lens(es) to collimate and combine the spatially transformed light 35 into spatially transformed light 45 as desired onto the illumination plane 38.

As can be seen by example in FIGS. 5 and 6, the illumination optics 18 may also include one or more beam shaping optics arranged along the light direction axis that work with the collimator lens 40, a multiple lens array 44 and an objective lens 46 to focus the light 15 emitted from the multichannel fiber cable 12 along the path of the axis to result in spatially transformed light 45 having a uniform distributed illumination onto the spatial light modulator (SLM). In the example shown in FIGS. 5 and 6, the beam shaping optics include a first lens 62 between the collimator lens 40 and the multiple lens array 44, and a second lens 64 between the multiple lens array and the objective lens 46. In this example, the first lens 62 is a convex cylinder lens and the second lens 64 is a concave cylinder lens. These beam shaping lenses may also be positioned in other locations depending on the requirements to achieve the desired size and angular distribution of the illumination pattern at the illumination plane.

Together the first and second beam shaping lenses form a beam expander that controls the size and angular distribution of the light 15 from the multichannel fiber cable 12 via the collimator lens 40 at the SLM 58 without the use of less compact conventional approaches such as long lightpipes that may be several inches long. For example, collimated light 25 entering the first lens 62 may be expanded 2.58 times along the X-axis to the illumination plane 38. While the beam shaping optics are shown as including two lenses in this example, it is understood that the beam shaping optics are not limited to any particular shape or number of lenses, as any shape or number of lenses needed to modify the size and angular distribution of light may be considered.

The double sided fly's eye array 52 depicted in FIG. 7 includes long rectangular lenslets 48 with cylindrical surface shapes aligned in the y-direction, so a flat-top irradiance profile is produced only in the x-direction. Note that a flat-top irradiance distribution would be produced if the lenslets 48 were rectangular lenslets with spherical surface shapes. The curved surfaces 50 of the lenslets 48 of the multiple lens array may be identical in shape. While not limited to a particular theory, a double-sided lenset array 44 having curved surfaces 50 aligned on opposite sides of lenslets 48 may minimize the size of the array, which leads to a reduction in the overall size of the illumination optics 18.

FIG. 7 thus may illustrate how a fly's eye lens array 52 transforms a properly conditioned input light field. This fly's eye lens array divides the input light field into sections. The objective lens 46 collimates and overlaps the beamlets of the spatially transformed light 35 to the illumination plane 38. These actions result in averaging out all of the nonuniformity in the input light field over the illumination plane. In this example the fly's eye lens array 52 is a double-sided lenslet array. The array 52 may be made of UV fused silica and may have anti-reflective coating on both sides. The array may be a one-dimensional microlens array with double-sided arrays of cylinder lenslets 48 used to produce uniform illumination in one dimension or direction, for example along the x-axis or y-axis where the z-axis is coincident with the optical axis or centerline of the optical system. The array may be small, for example sized at 10 mm×10 mm or 5 mm×5 mm. The array may be a two-dimensional microlens array with double-sided arrays of rectangular lenslets 48 used to produce uniform illumination in two dimensions or directions, for example along the x-axis and the y-axis where the z-axis is coincident with the optical axis or centerline of the optical system. The lenslets may be square or rectangular with, for example, about 250 μm-1.0 mm pitch sizes. Of course for rectangular lenslets the pitch can be different in each direction. Two crossed one-dimensional fly's eye lens arrays may also be used to function effectively as a two-dimensional fly's eye lens array to produce uniform illumination in two directions.

Figure 8:
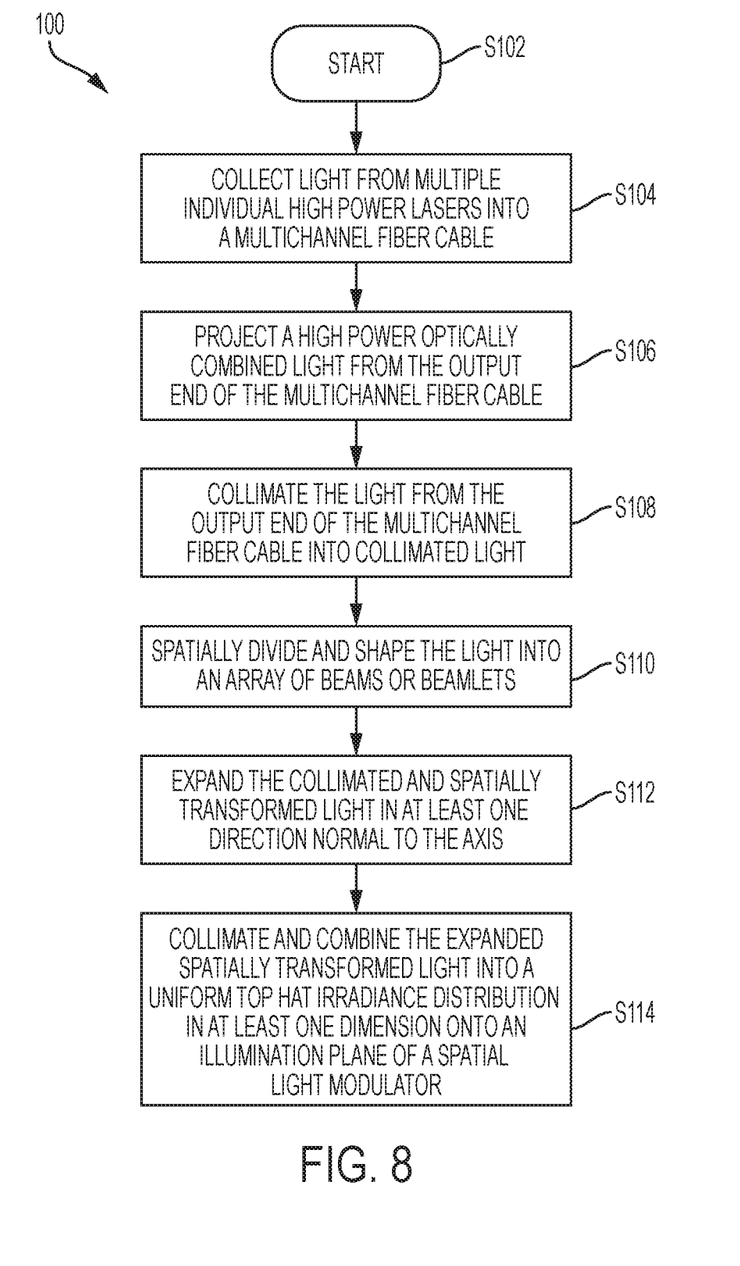
FIG. 8 is a flowchart of an exemplary method for high power illumination in accordance with embodiments.

FIG. 8 is a flowchart depicting an exemplary method 100 for averaging out the non-uniformity of light from multiple high power lasers into a uniform irradiance distribution onto an illumination plane. At Step S102, the method 100 begins. At Step S104, light from multiple individual high power lasers having the same wavelength and polarization characteristics is collected into a multichannel fiber cable. The cable may include an input end and an output end, with the input end having a plurality of individual optical fibers that are optically coupled into a single output aligned array of the individual optical fibers at the output end.

At Step S106, a high power optically combined light is projected from the output end of the multichannel fiber cable. At Step S108, the light from the output end of the multichannel fiber cable is collimated via a collimator lense into collimated light. At Step S110, the collimated light from the collimator lens is spatially divided into transformed light consisting of an array of beams or beamlets by a multiple lens array having multiple individual optical elements with curved surfaces. The multiple lens array may divide the collimated light into sections. At Step S112, beam shaping optics expand the collimated and spatially transformed light in at least one direction normal to the axis and relay the expanded light to the objective lens. At Step S114, the light from the multiple lens array and beam shaping optics is collimated and combined with an objective lens onto an illumination plane at a spatial light modulator. The output end of the multichannel fiber cable, the collimator lens, the multiple lens array, the beam shaping optics, and the objective lens may be aligned along an axis corresponding to the direction of the light.

It should be noted that although not explicitly specified, one or more steps, functions, or operations of the method 100 described above may include expanding the collimated light in at least one direction normal to the axis and relaying the expanded light to the objective lens.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 8, and the accompanying description, except where any particular method step is reasonably considered to be a necessary precondition to execution of any other method step. Additionally, not all of the depicted and described method steps need to be included in any particular scheme according to disclosure.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An illumination optical system, comprising:
 a multichannel fiber cable including an input end and an output end, the input end having a plurality of individual optical fibers that are optically coupled into a single output aligned array of the individual optical fibers at the output end, the multichannel fiber cable adapted to collect light from multiple individual lasers having the same wavelength and polarization characteristics and to output an optically combined light from the output end of the multichannel fiber cable;
 a collimator lens that collimates the light from the output end of the multichannel fiber cable; and
 a multiple lens array including multiple individual optical elements having curved surfaces that spatially divides the collimated light relayed from the collimator lens and shapes the light into a spatially transformed light having an array of beams or beamlets in at least one dimension, the multiple lens array configured to divide the collimated light into sections,
 wherein the output end of the multichannel fiber cable, the collimator lens and the multiple lens array are aligned along an axis corresponding to the direction of the optically combined light from the output end of the multichannel fiber cable.

2. The illumination optical system of claim 1, further comprising an objective lens aligned along the axis corresponding to the direction of the optically combined light from the output end of the multichannel fiber cable, the objective lens configured to collimate and overlap the beamlets of the spatially transformed light onto a spatial light modulator.

3. The illumination optical system of claim 2, further comprising beam shaping optics arranged along the axis, the beam shaping optics expanding the collimated light in at least one direction normal to the axis and relaying the expanded light to the objective lens, wherein the collimated and overlapped beamlets of the spatially transformed light has a uniform irradiance distribution in the at least one dimension.

4. The illumination optical system of claim 3, the beam shaping optics including two cylinder lenses, with a first one of the cylinder lenses arranged between the collimator lens and the multiple lens array, and the second one of the cylinder lenses arranged between the multiple lens array and the objective lens.

5. The illumination optical system of claim 4, wherein the first one of the cylinder lenses is a convex lens and the second one of the cylinder lenses is a concave lens, with both of the two cylinder lenses having power in the fast axis.

6. The illumination optical system of claim 2, wherein the objective lens is a spherical objective lens or a cylinder lens.

7. The illumination optical system of claim 1, wherein the light from each of the plurality of individual optical fibers irradiates every section.

8. The illumination optical system of claim 1, wherein the multiple lens array is a fly's eye lens array.

9. The illumination optical system of claim 8, wherein the fly's eye lens array includes a double sided fly's eye array having rectangular lenslets with cylindrical surface shapes aligned in a fast (y) axis direction to produce a flat-top irradiance profile only in the slow (x) axis direction.

10. The illumination optical system of claim 1, wherein the multiple lens array includes a double sided fly's eye array having rectangular lenslets with spherical surface shapes.

11. The illumination optical system of claim 1, wherein the collimator lens is an aspheric collimator lens.

12. The illumination optical system of claim 1, wherein the multiple lens array is a single optical element, and the curved surfaces of the multiple individual optical elements are identical in shape.

13. A method for illumination onto a spatial light modulator, the method comprising:
a) collecting light from multiple individual lasers having the same wavelength and polarization characteristics into a multichannel fiber cable including an input end and an output end, the input end having a plurality of individual optical fibers that are optically coupled into a single output aligned array of the individual optical fibers at the output end;
b) outputting an optically combined light from the output end of the multichannel fiber cable;
c) collimating the light from the output end of the multichannel fiber cable into collimated light with a collimator lens; and
d) spatially homogenizing the collimated light relayed from the collimator lens and shaping the collimated light into a spatially transformed light illuminated towards the spatial light modulator, the spatially transformed light having an array of beams or beamlets in at least one dimension via a multiple lens array including multiple individual optical elements having curved surfaces, the multiple lens array dividing the collimated light into sections,
wherein the output end of the multichannel fiber cable, the collimator lens and the multiple lens array are aligned along an axis corresponding to the direction of the optically combined light from the output end of the multichannel fiber cable.

14. The method of claim 13, further comprising collimating and overlapping the beamlets of the spatially transformed light onto a spatial light modulator with an objective lens aligned along the axis corresponding to the direction of the optically combined light from the output end of the multichannel fiber cable.

15. The method of claim 14, further comprising expanding the collimated light in at least one direction normal to the axis and relaying the expanded light to the objective lens.

16. The method of claim 14, further comprising shaping the collimated light with a first cylinder lens arranged between the collimator lens and the multiple lens array to direct all of the collimated light onto the multiple lens array, and expanding the spatially transformed light from the multiple lens array to an expanded light with a second cylinder lens arranged between the multiple lens array and the objective lens to relay the expanded light to the objective lens, wherein the collimated and overlapped beamlets of the spatially transformed light has a uniform irradiance distribution in the at least one dimension.

17. An illumination optical system, comprising:
a multichannel fiber cable including an input end and an output end, the input end having a plurality of individual optical fibers that are optically coupled into a single output aligned array of the individual optical fibers at the output end, the multichannel fiber cable adapted to collect light from multiple individual lasers having the same wavelength and polarization characteristics and to output an optically combined light from the output end of the multichannel fiber cable; and
illumination optics configured to manipulate the optically combined light from the output end of the multichannel fiber cable spatially and angularly for projection onto a spatial light modulator, wherein the output end of the multichannel fiber cable and the illumination optics are aligned along an axis corresponding to the direction of the optically combined light from the output end of the multichannel fiber cable.

18. The illumination optical system of claim 17, wherein the illumination optics include
a collimator lens that collimates the light from the output end of the multichannel fiber cable, and a multiple lens array including multiple individual optical elements having curved surfaces that spatially divides the collimated light relayed from the collimator lens and shapes the light into a spatially transformed light having an array of beams or beamlets in at least one dimension, the multiple lens array configured to divide the collimated light into sections,
wherein the output end of the multichannel fiber cable, the collimator lens and the multiple lens array are aligned along an axis corresponding to the direction of the optically combined light from the output end of the multichannel fiber cable.

19. The illumination optical system of claim 18, wherein divergence of the light exiting each fiber is less than a divergence of the multiple lens array.

20. The illumination optical system of claim 18, the illumination optics further including an objective lens aligned along the axis corresponding to the direction of the optically combined light from the output end of the multi-channel fiber cable, the objective lens configured to collimate and overlap the beamlets of the spatially transformed light onto a spatial light modulator.

\* \* \* \* \*